United States Patent [19]

Mansell

[11] Patent Number: 4,484,989

[45] Date of Patent: Nov. 27, 1984

[54] ELECTRO ORGANIC METHOD AND APPARATUS FOR CARRYING OUT SAME

[75] Inventor: John D. Mansell, Akron, Ohio

[73] Assignee: PPG Industries, Inc., Pittsburgh, Pa.

[21] Appl. No.: 478,929

[22] Filed: Mar. 25, 1983

[51] Int. Cl.³ .......................... C25C 1/00; C25B 13/00
[52] U.S. Cl. .................................... 204/59 R; 204/296
[58] Field of Search ................ 204/296, 59 R, 78, 79, 204/80

[56] References Cited

PUBLICATIONS

Petranek et al., Anal. Chim. Acta, 1974, vol. 72, pp. 375-380.
Takahashi et al., Kagaku Kogaku Ronbunshu, 1981, vol. 7, No. 5, pp. 494-499.
Ogata et al., J. Appl. Polym. Sci., 1981, vol. 26, No. 12, pp. 4149-4159.

Primary Examiner—John F. Niebling
Attorney, Agent, or Firm—Mark Levin; Richard M. Goldman

[57] ABSTRACT

Discloses a solid polymer electrolyte having ring ethers bonded to a polymer matrix, with metal ions chelated by the ring ethers.

4 Claims, 3 Drawing Figures

ELECTRO ORGANIC METHOD AND APPARATUS FOR CARRYING OUT SAME

DESCRIPTION OF THE INVENTION

Electrolytic synthesis of organic compounds in an electrolytic cell has generally proven to be industrially unsatisfactory. This is because of the necessity of providing a current carrier, i.e., an ionizable molecule, to carry charge between the anode and the cathode. The organic reactants and products themselves generally will not perform this function because of their lack of ionic character.

One attempt at eliminating the requirement for a dissolved, ionized, or liquid current carrying supporting electrolyte is disclosed in U.S. Pat. No. 3,427,234 to Guthke et al. and Japanese Pat. No. 56/23290 to Yoshizawa et al., both of which describe the use of a solid polymer electrolyte electrolytic cell to carry out the electrolytic synthesis of organic compounds. In a solid polymer electrolyte electrolytic cell the anode is in contact with one surface of the solid polymer electrolyte, and the cathode is in contact with the other surface of the solid polymer electrolyte. The solid polymer electrolyte itself is a polymeric material having pendant ionic groups which enhance the ionic conductivity of the underlying polymer matrix. Thus, negatively charged particles may flow from the cathode through the solid polymer electrolyte to the anode, without having to pass through the organic media or positively charged particles may travel from the anode through the solid polymer electrolyte to the cathode, likewise without having to pass through the organic media. In the solid polymer electrolyte as described in Guthke et al. and Yoshizawa et al., the cathodic reaction takes place at an electrode-liquid organic reactant interface, a surface of the cathode being in contact with the solid polymer electrolyte. The anodic reaction takes place at an electrode-liquid organic reactant interface, a surface of the anode being in contact with the solid polymer electrolyte. Charged particles traverse the solid polymer electrolyte as described hereinabove.

However, the provision of a solid polymer electrolyte in contact with both the anode and the cathode, does not, alone, provide an industrially useful electrolytic cell for electroorganic synthesis. For example, the typical prior art permionic membrane materials, such as DuPont NAFION® described, for example, in U.S. Pat. Nos. 3,041,317 to Gibbs, 3,718,617 to Grot, and 3,849,243 to Grot, the Asahi Glass Company, Ltd. permionic membrane described, e.g., in U.S. Pat. Nos. 4,065,366 to Oda et al., 4,116,888 to Ukihashi et al. and 4,126,588 to Ukihashi et al., and the Asahi Chemical Company permionic membrane materials, described in U.S. Pat. No. 4,151,053 to Seko et al., require water of hydration. The combination of water of hydration and immobilized ionic sites, bonded to the polymer, provide ionic conductivity through the permionic membrane. In the absence of water of hydration, the electrical resistivity of the permionic membrane and more particularly, the resistance to ionic transport of the permionic membrane, is objectionably higher. As organic media are typically non-aqueous, the aforementioned permionic membranes when employed in such organic media are unable to attain or maintain an equilibrium content of water of hydration. Similarly, where the reaction medium is an anhydrous gas phase medium, the reactants and products also being anhydrous gases, the aforementioned permionic membrane materials are incapable of maintaining an equilibrium water of hydration content.

Therefore, means must be provided within the permionic membrane to provide continuing ionic mobility in the presence of anhydrous reactants and products, including gaseous organic reactants and products. As described in the commonly assigned, copending application Ser. No. 478,928 of N. R. DeLue and S. R. Pickens, for *Electro Organic Method And Apparatus For Carrying Out Same,* filed on even date herewith, ionic mobility may be provided by providing ionic means within the solid polymer electrolyte structure itself. Exemplary ionic means within the solid electrolyte structure include, e.g., entrapped but mobile ionic means as a strong electrolyte, the presence of an aqueous electrolyte in a solid polymer electrolyte structure having hydrophobic boundaries whereby to maintain the aqueous electrolyte therein, or the presence of polar, ionic organic moieties within the permionic membrane or solid electrolyte with means either for preventing their escaping therefrom or for retaining them therein.

Moreover, when such means are provided within the solid electrolyte, e.g., the solid polymer electrolyte, electroorganic or other non-aqueous reactions may be carried out in either a divided cell, i.e., a cell where the solid electrolyte, solid polymer electrolyte, or permionic membrane divides the cell into anode and cathode compartments, or in electrolytic cells where the reaction medium, i.e., the reactants, products, and any other materials are present in one unitary medium, containing both the anode and the cathode. Thus, it is further contemplated by DeLue and Pickens hereinabove, to utilize a solid electrolyte, which may be a solid polymer electrolyte, in an electrolytic cell where the anode and cathode are in contact with essentially the same reaction medium, the external surfaces of the anode and cathode being in contact with the reaction medium, and other surfaces, e.g., the internal surfaces of the anode and cathode, being in contact with a solid electrolyte as a solid polymer electrolyte, or permionic membrane, or inorganic solid electrolyte. In this way, the reactions principally occur at a site on the cathode or anode which is not embedded in the solid electrolyte. That is the reactions principally occur at the external surfaces of the respective electrodes, i.e., at the interfaces of the respective electrodes with the reaction medium, while ionic transport is through the solid electrolyte. The herein contemplated structure may be used with either liquid or gaseous reactants and products.

The solid electrolyte contemplated herein is, a solid polymer electrolyte, or a solid polymer electrolyte comprised of multiple zones having a highly ionizable current carrier therein, the solid polymer electrolyte having ring ethers bonded to a polymeric backbone, and having metal ions chelated by the ring ethers.

The electrodes may be removably in contact with the external surfaces of the solid electrolyte, bonded to external surfaces of the solid electrolyte, or bonded to and embedded in the solid electrolyte, and electrocatalyst may independently be covalently bonded to reactive ligands which ligands are in contact with, bonded to, or reactive with the solid polymer electrolyte.

As herein contemplated the supporting electrolyte and polar solvents normally required in the prior art may be substantially reduced or even eliminated. This results in a product of higher purity, greater ease of separation, fewer side reactions, and more constant potential. Moreover, the invention herein contemplated permits greater choice in the selection of the organic solvent, without regard to the presence or absence of a supporting electrolyte.

FIGURES

DETAILED DESCRIPTION OF THE INVENTION

The invention herein contemplated resides in a permionic membrane useful in electrolytically synthesizing organic compounds and in a method of electrolytically synthesizing organic compounds utilizing the membrane. The invention herein contemplated resides in a permionic membrane comprising a polymeric matrix having crown ethers grafted thereto and alkali metal ions chelated to the crown ethers.

According to one exemplification of the invention, gas phase organic reactions may be carried out utilizing the permionic membrane herein contemplated. Gas phase organic electrolytic reactions present special problems because of the absence of water of hydration, polarizable liquids, or ionic liquids. Thus, as herein contemplated, gas phase organic reactions may be carried out by reacting an organic reactant at an electrode of an anode-cathode electrode pair to form an organic product. The method herein contemplated comprises contacting one member of the electrode pair, i.e., the anode-cathode pair with the organic gaseous reactant while externally imposing an electrical potential across the electrode pair, the organic reactant and the organic product being gaseous, and both electrodes of the electrode pair being in contact with crown ether solid electrolyte means therebetween, e.g., as shown in FIGS. 1 through 3, inclusive.

More particularly, in distinction to fuel cell reactions, the contemplated reactions provide useful chemical products other than water or oxides of carbon. Moreover, the reactions contemplated herein require energy to be supplied to the system whereby to form the product, as by externally imposing an electrical potential across the anode and cathode.

Figure 1:
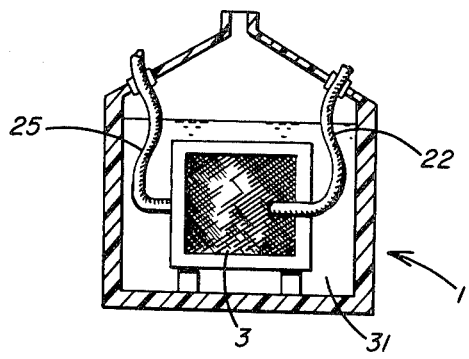
FIG. 1 is a cutaway front elevation of an electrolytic cell in which the herein contemplated permionic membrane may be used.
Figure 2:
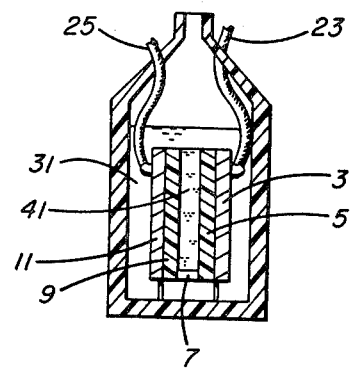
FIG. 2 is a cutaway side elevation of the electrolytic cell shown in FIG. 1.
Figure 3:
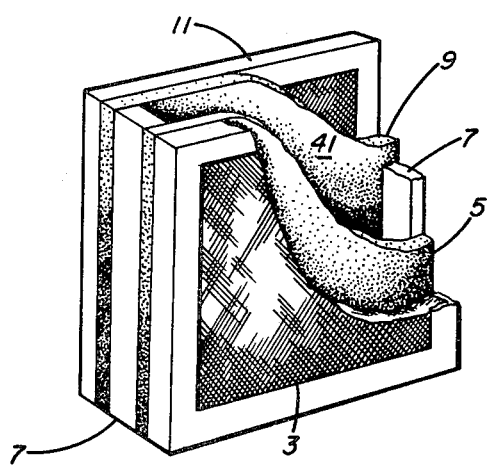
FIG. 3 is an isometric, partial cutaway, of the electrode-solid electrolyte-electrode assembly of the electrolytic cell shown in FIGS. 1 and 2.

An electrolytic cell structure for carrying out the method of this invention is shown in FIGS. 1, 2 and 3. As there shown, an electrolytic cell (1) has a structure of an anode (3), a solid electrolyte (5) in contact with the anode, a second solid electrolyte (9) in contact with the cathode (11), and a seal (7) between the two solid electrolyte portions (5) and (9). The structure of the anode side solid electrolyte portions (5), the cathode side of the solid electrolyte portion (9), and seal (7) may contain a highly ionizable material 41 whereby to provide ion transport between the anode and cathode. Also shown in FIGS. 1 and 2 is an anode contact (23), cathode contact (25), and a unitary reaction medium (31) of reagent and reactant which may be in contact with both the anode and cathode, or, the anode and cathode may be separated from each other by the solid electrolyte structure of solid electrolyte (5), seal (7), and solid electrolyte (9), with separate anode and cathode compartments. The ionizable current carrier (41) is between the two portions (5) and (9) of the solid electrolyte, the anode (3), and the cathode (11).

While the anode-solid electrolyte-cathode is shown in the figures as an assembly of planar elements, it may also be an assembly that is of an open construction, i.e., to allow the organic medium to flow through the anode-solid electrolyte-cathode structure.

In a further exemplification of the method of this invention, which may utilize the above-described structure and contemplated crown ether permionic membrane, a gaseous phase reaction may be carried out at either the anode or the cathode or both, by contacting the appropriate electrode or electrodes with the gas phase reactant or reactants in forming gas phase product or products. By a gas phase reactant or product is meant a reactant or product that is gaseous at the temperatures and pressures within the electrolyte cell. For example, as described in the commonly assigned, co-pending application Ser. No. 478,940 of N. R. DeLue for *Electro Organic Method And Apparatus For Carrying Out Same,* filed on even date herewith, an olefin may be oxidized at an anode by contacting the anode with the olefin, where the olefin is gaseous and the anode and cathode are both in contact with an anion selective solid polymer electrolyte having ionic current carrying means incorporated therein. Typical olefins which may be oxidized this way include ethylene, propylene, butylene and the like, whereby to provide alcohols, glycols, aldehydes, acids, carbonates, alkyl oxides, and mixtures thereof. As herein contemplated, the solid electrolyte is an anion selective crown ether permionic membrane so that hydroxyl ion present at the cathode is transported to the anode, the hydroxyl ion then participating in the oxidation of the olefin.

As described hereinabove, the solid polymer electrolyte contains means for transporting ions therethrough. This is especially significant in processes involving non-aqueous media, such as organic media, where by nonaqueous is meant that the behavior of the media of reactant and/or product is substantially that of non-ionizable organic material, incapable of carrying charge at industrially feasible voltages. That is, the reactant and product medium functions as an insulator or dielectric rather than as a conductor. By non-aqueous media is meant substantially or essentially anhydrous media. The non-aqueous medium is not necessarily electrolyzed. It may simply serve as a solvent or diluent for the product or reactant. In the method herein contemplated, utilizing the structure above-described, the reagent is electrolyzed at an electrode means, where the anode is in contact with one surface of the solid electrolyte means and the cathode is in contact with the opposite surface of the solid polymer electrolyte means. As herein contemplated, the non-aqueous medium containing an organic reactant is provided in contact with one or both of the anode and cathode and an electrical potential is externally imposed across the anode and cathode so as to evolve product at an anode or a cathode or both and transport ionic species across the solid electrolyte means. As herein contemplated the solid polymer electrolyte means comprises an entrapped ion transport medium, e.g., an entrapped immobilized ion transport medium or an entrapped mobile ion transport medium, as the chelated alkali metal.

The structure of anode (3) solid electrolyte means (5), (7), (9), cathode (11), may divide the electrolytic cell into separate anode and cathode compartments. When the cell is so divided, the anode is in contact with anode compartment reactant and product, and the cathode is in contact with cathode compartment reactant and product, the anode compartment medium and cathode compartment medium being capable of supporting different chemistries and conditions. Alternatively, the anode (3), solid electrolyte means (5), (7), (9), and cathode (11) may be in contact with the same non-aqueous medium, e.g., the structure may be porous or immersed in a single medium as described in the commonly assigned, copending application Ser. No. 478,928 of N. R. DeLue and S. R. Pickens for *Electro Organic Method And Apparatus For Carrying Out Same,* filed on even date herewith. As, for example, shown in FIGS. 1 and 2, the solid electrolyte means (5), (7), (9), provides electrical conductivity between the anode (3) and cathode (11), and the liquid (31) contains the reaction medium.

The solid electrolyte means (5), (7), (9), may include a hollow or laminated permionic membrane structure having an ionizable aqueous or non-aqueous liquid (41) therebetween. Thus, the solid electrolyte means may comprise two sheets (5), and (7) of crown ether ion-exchange resin material having a zone, volume, or layer (41) of ionic aqueous material therebetween. Additionally, one or both of the sheets (5), (9) of the crown ether ion-exchange resin material may have a hydrophobic layer, not shown, thereon, whereby to retain the ionic aqueous material within the structure of the permionic membrane sheets and ionizable current carrier compartment (41). Alternatively, the solid electrolyte means (5), (7), (9), may be a single sheet of crown ether permionic membrane material, containing a highly ionizable aqueous material therein, and having hydrophobic layers on the external surfaces thereof whereby to retain the ionic aqueous material within the solid electrolyte means.

Alternatively, the current carrier medium (41), may contain an oxidation and reduction resistant polarizable compound capable of solvating ions. Exemplary materials include glycols, glycol ethers, ammonium salts, crown ethers, alcohols, nitro compounds, carboxylic acids, esters, sulfoxides, and the like.

The solid polymer electrolyte is provided by a polymeric matrix having crown ethers grafted thereto and metal ions chelated to the crown ethers. Thus, the permionic membrane is a polymeric matrix having a low degree of cross-linking and a glass transition temperature at least about 20 degrees Centigrade below the intended temperature of the solid polymer electrolyte and/or the reaction medium. Exemplary are polyolefins, polyethers, polyesters, polyamides, polyurethanes, polyphenol formaldehydes, and other polymers stable to cell conditions. The crown ether bonded thereto is chosen from the group consisting of cyclic polymers of ethylene oxide having from 4 to 6 ($CH_2CH_2O$) units, e.g., 12-crown-4, 15-crown-5, 18-crown-6, and dicyclohexano and dibenzo derivatives thereof.

Exemplary chelated metals are alkali metals such as sodium, potassium, and lithium. Alternatively alkaline earth metals, such as calcium or magnesium and transition metals such as iron, cobalt or nickel may be chelated by the crown ether.

Especially desirable results are obtained where the crown ether is about 1 to about 50 weight percent of the permionic membrane, basis weight of polymeric matrix and crown ether. Thus, as herein contemplated, electrolysis may be carried out in an electrolytic cell having an anode, cathode, and a permionic membrane therebetween, by externally imposing an electrical potential across the electrolytic cell whereby to cause an ionic current to flow from the anode through the permionic membrane to the cathode, the permionic membrane being an anion selective permionic membrane comprising the above-described polymeric matrix having crown ethers grafted thereto.

According to an alternative exemplification, the permionic membrane useful in carrying out this invention may have a porous, gas and liquid permeable, non-electrode layer bonded to either the anodic surface, or the cathodic surface, or both the anodic and cathodic surfaces thereof, as described in British Laid Open Patent Application No. 2,064,586 of Oda et al. As described by Oda et al., the porous, non-catalytic, gas and electrolyte permeable, non-electrode layer does not have a catalytic action for the electrode reaction, and does not act as an electrode.

The porous, non-electrode layer is formed of either a hydrophobic or a non-hydrophobic material, either organic or inorganic. As disclosed by Oda et al., the non-electrode material may be electrically non-conductive. That is, it may have an electrical resistivity above 0.1 ohm-centimeter, or even above 1 ohm-centimeter. Alternatively, the porous, non-electrode layer may be formed of an electrically conductive material having a higher overvoltage for the desired electrochemical reaction than the electrode material placed outside the porous, non-electrode layer, i.e., the porous, non-electrode layer may be formed of an electrically conductive material that is less electrocatalytic than the electrode material placed outside the porous, non-electrode layer.

The material in the porous, non-electrode layer is preferably a metal, metal oxide, metal hydroxide, metal nitride, metal carbide, or metal boride of a Groupd IVA metal, e.g., Si, Ge, Sn, or Pb, a Group IVB metal, e.g., Ti, Zr, or Hf, a Group V-B metal, e.g., V, Nb, or Ta, a Group VIB metal, e.g., Cr, Mo, or W, or a Group VIII "Iron Triad" metal, Fe, Co, or Ni. Especially preferred non-electrode materials are Fe, Ti, Ni, Zr, Ta, V, and Sn, and the oxides, hydroxides, borides, carbides, and nitrides thereof, as well as mixtures thereof. Such material may have hydrophobic coatings thereon. For example, such materials may have hydrophobic coatings on at least a portion thereof whereby to exhibit hydrophobic and non-hydrophobic zones.

Alternatively, the film, coating, or layer may be formed of a perfluorocarbon polymer as such or rendered suitably hydrophilic, i.e., by the addition of a mineral, as potassium titanate.

The non-electrode material is present in the porous film, coating, or layer as a particulate. The particles have a size range of from about 0.01 micron to about 300 microns, and preferably of from about 0.1 to 100 microns. The loading of particles is from about 0.01 to about 30 milligrams per square centimeter, and preferably from about 0.1 to about 15 milligrams per square centimeter.

The porous film, coating or layer has a porosity of from about 10 percent to 99 percent, preferably from about 25 to 95 percent, and in a particularly preferred exemplification from about 40 to 90 percent.

The porous film, coating or layer is from about 0.01 to about 200 microns thick, preferably from about 0.1 to about 100 microns thick, and in a particularly preferred embodiment, from about 1 to 50 microns thick.

When the particles are not directly bonded to and embedded in the permionic membrane a binder is used to provide adhesion. The binder may be a fluorocarbon polymer, preferably a perfluorocarbon polymer, as polytetrafluoroethylene, polyhexafluoropropylene, or a perfluoroalkoxy, or a copolymer thereof with an olefinically unsaturated perfluorinated acid, e.g., having sulfonic or carboxylic functionality.

In an electrolytic cell environment where perfluorinated polymers are not required, the binder may be a hydrocarbon polymer such as a polymer or copolymer of ethylene, propylene, butylene, butadiene, styrene, divinylbenzene, acrylonitrile, or the like. Other polymeric materials such as polyethers, polyesters, polyamides, polyurethanes, polycarbonates, and the like may be employed. Such polymeric binding agents may also have acidic or basic functionality.

The electrodes (3), (11), bear upon the porous, non-electrode surface.

Various electrode structures may be utilized herein. For example, the electrode may be adhered to the solid electrolyte, as a film, coating, or layer thereon, either with or without hydrophilic or hydrophobic additives. Alternatively, the electrodes may be on separate catalyst carriers which removably bear on the solid electrolyte. Suitable electrocatalyst materials depend upon the particular reaction to be catalyzed, and may typically include transition metals, oxides of transition metals, semi-conductors, and oxygen deficient crystalline materials. Alternatively, such materials as transition metals having "d" subshell or orbital activity may be utilized, e.g., iron, cobalt, nickel, and the platinum group metals.

Various reactions may be carried out according to the method of this invention. For example, organic compounds may be reduced at the cathode or oxidized at the anode.

I claim:

1. A solid permionic membrane comprising a polymeric matrix having crown ethers grafted thereto and metal ions chelated to said crown ethers wherein said crown ether is chosen from the group consisting of 12-crown-4, 15-crown-5, 18-crown-6, and dicyclohexano and dibenzo derivatives thereof.

2. The permionic membrane of claim 1 wherein the polymeric matrix is chosen from the group consisting of polyolefins, polyethers, polyesters, polyamides, polyurethanes, polycarbonates, and polyphenol formaldehydes.

3. In a method of conducting electrolysis in an electrolytic cell having an anode, a cathode, and a permionic membrane therebetween, which method comprises externally imposing an electrical potential across said electrolytic cell whereby to cause an electrical current to flow from said anode through said permionic membrane to said cathode, the improvement wherein said permionic membrane is a solid cation selective membrane comprising a polymeric matrix having crown ethers grafted to said matrix and metal ions chelated to said crown ethers wherein said crown ether is chosen from the group consisting of 12-crown-4, 15-crown-5, 18-crown-6, dicyclohexano derivatives thereof, and dibenzo derivatives thereof.

4. The method of claim 3 wherein the polymeric matrix is chosen from the group consisting of polyolefins, polyethers, polyesters, polyamides, polyurethanes, polycarbonates, and polyphenol formaldehydes.

* * * * *